United States Patent
Lee et al.

(10) Patent No.: US 11,246,146 B2
(45) Date of Patent: Feb. 8, 2022

(54) METHOD FOR TERMINAL OPERATING V2X IN WIRELESS COMMUNICATION SYSTEM AND TERMINAL USING THE METHOD

(71) Applicant: LG Electronics Inc., Seoul (KR)

(72) Inventors: Seungmin Lee, Seoul (KR); Hanbyul Seo, Seoul (KR)

(73) Assignee: LG ELECTRONICS INC., Seoul (KR)

(*) Notice: Subject to any disclaimer, the term of this patent is extended or adjusted under 35 U.S.C. 154(b) by 85 days.

(21) Appl. No.: 16/603,683

(22) PCT Filed: Apr. 30, 2018

(86) PCT No.: PCT/KR2018/005039
§ 371 (c)(1),
(2) Date: Oct. 8, 2019

(87) PCT Pub. No.: WO2018/199728
PCT Pub. Date: Nov. 1, 2018

(65) Prior Publication Data
US 2020/0120685 A1    Apr. 16, 2020

Related U.S. Application Data

(60) Provisional application No. 62/491,340, filed on Apr. 28, 2017.

(51) Int. Cl.
*H04W 72/10* (2009.01)
*H04W 4/40* (2018.01)
(Continued)

(52) U.S. Cl.
CPC .............. *H04W 72/10* (2013.01); *H04W 4/40* (2018.02); *H04W 24/08* (2013.01);
(Continued)

(58) Field of Classification Search
CPC ....... H04W 72/10; H04W 4/40; H04W 24/08; H04W 52/367; H04W 72/0453; H04W 72/085; H04W 74/0833
See application file for complete search history.

(56) References Cited

U.S. PATENT DOCUMENTS 10,425,220 B2 * 9/2019 Tsai ...................... H04L 47/17
2015/0195827 A1 7/2015 Feng et al.
(Continued)

FOREIGN PATENT DOCUMENTS

EP          3334229 A1    6/2018
KR    1020120061798        6/2012
(Continued)

OTHER PUBLICATIONS

Samsung, "Discussion on congestion control", 3GPP TSG RAN WG1 #87, Nov. 14-18, 2016, R1-1612392.
(Continued)

*Primary Examiner* — Siming Liu
(74) *Attorney, Agent, or Firm* — Dentons US LLP

(57) ABSTRACT

Provided is a method for a terminal operating vehicle to everything (V2X) in a wireless communication system. The method comprises: receiving, from a network, a setting indicating a specific carrier transmitting or receiving a first service; selecting a carrier from among carriers within a specific range in a frequency area based on the specific carrier indicated by the setting; and transmitting a V2X signal from the selected carrier, wherein the first service has a higher priority than a second service relating to the V2X signal.

12 Claims, 15 Drawing Sheets

(51) Int. Cl.
*H04W 24/08* (2009.01)
*H04W 52/36* (2009.01)
*H04W 72/04* (2009.01)
*H04W 72/08* (2009.01)
*H04W 74/08* (2009.01)

(52) U.S. Cl.
CPC ..... *H04W 52/367* (2013.01); *H04W 72/0453* (2013.01); *H04W 72/085* (2013.01); *H04W 74/0833* (2013.01)

(56) References Cited

U.S. PATENT DOCUMENTS

| | | | |
|---|---|---|---|
| 2016/0285935 A1* | 9/2016 | Wu | G08G 1/161 |
| 2016/0295624 A1* | 10/2016 | Novlan | H04W 72/04 |
| 2017/0019887 A1* | 1/2017 | Jiang | H04W 72/0406 |
| 2017/0188391 A1* | 6/2017 | Rajagopal | H04W 74/0816 |
| 2017/0215119 A1* | 7/2017 | Hong | H04W 36/0072 |
| 2017/0331620 A1* | 11/2017 | Tsai | H04W 56/00 |
| 2018/0049220 A1* | 2/2018 | Patil | H04W 72/1247 |
| 2018/0132193 A1* | 5/2018 | Misener | H04W 4/46 |
| 2018/0139669 A1 | 5/2018 | Jung et al. | |
| 2018/0199223 A1 | 7/2018 | Kim et al. | |
| 2018/0261097 A1* | 9/2018 | Jiang | G08G 1/096791 |

FOREIGN PATENT DOCUMENTS

| | | |
|---|---|---|
| WO | 2016163824 | 10/2016 |
| WO | 2016186395 | 11/2016 |
| WO | 2017010774 | 1/2017 |
| WO | 2017027355 A1 | 2/2017 |
| WO | 2017049536 A1 | 3/2017 |

OTHER PUBLICATIONS

Intel Corporation, "On Carrier Aggregation for LTE V2V Sidelink Communication", 3GPP TSG RAN1 WG Meeting #88bis, Apr. 3-7, 2017, R1-1705446.

* cited by examiner

METHOD FOR TERMINAL OPERATING V2X IN WIRELESS COMMUNICATION SYSTEM AND TERMINAL USING THE METHOD

This application is the National Stage filing under 35 U.S.C. 371 of International Application No. PCT/KR2018/005039, filed on Apr. 30, 2018, which claims the benefit of U.S. Provisional Application No. 62/491,340 filed on Apr. 28, 2017, the contents of which are all hereby incorporated by reference herein in their entirety.

BACKGROUND ARTS

Field of the Description

The present description relates to wireless communication, and more particularly, to a method for a vehicle-to-everything (V2X) operation of a user equipment (UE) in a wireless communication system, and the UE using the method.

Related Art

Meanwhile, recently, there is a growing increase in a device-to-device (D2D) technique for performing direct communication between devices. In particular, the D2D is drawing attention as a communication technique for a public safety network. The public safety network has a higher service requirement (reliability and safety) in comparison with the commercial communication network, and in particular, even if cellular communication is performed in an out-of-coverage state or is not available, also demands direct signal transmission/reception between devices, i.e., a D2D operation.

The D2D operation may have various advantages in a sense that it is signal transmission/reception between proximate devices. For example, a D2D user equipment (UE) may perform data communication with a high transfer rate and a low delay. In addition, the D2D operation may distribute traffic concentrated on a base station, and may have a role of extending coverage of the base station if the D2D UE plays a role of a relay.

Meanwhile, in LTE-A, a UE-to-UE interface is referred to as a sidelink. The sidelink may be used not only in communication between UEs installed in a vehicle but also in communication, i.e., vehicle-to-everything (V2X), between the UE installed in the vehicle and another UE.

Among services provided on a specific carrier adjacent to a carrier on which a UE intends to perform a V2X operation, there may be a service (e.g., a tolling service, etc.) to be protected or performed with a relatively high priority. In addition, since a V2X operation using an intelligent transport system (ITS) band of 5.9 GHz is considered in LTE cellular-V2X (C-V2X), there may be a problem in IEEE 802.11P-based collision with dedicated short range communication (DSRC) which is different-type wireless communication using the same frequency band and leakage interference or the like caused by an V2X operation performed on an adjacent carrier. Herein, the DSRC service may also be a service to be protected or performed with the relatively high priority.

As described above, there may be a case where the V2X operation is performed on a carrier adjacent to a specific carrier on which a service to be protected with a relatively high priority is provided. In this case, there is a need for a method and apparatus for performing the V2X operation while reducing leakage interference on the carrier on which the service having the relatively high priority is provided.

SUMMARY OF THE DESCRIPTION

The present description provides a method for a vehicle-to-everything (V2X) operation of a user equipment (UE) in a wireless communication system, and the UE using the method.

In one aspect, a method for a vehicle to everything (V2X) operation of a user equipment (UE) in a wireless communication system is provided. The method comprises receiving from a network a configuration for indicating a specific carrier on which a first service is transmitted or received, selecting a carrier from among carriers within a specific range in a frequency domain on the basis of the specific carrier indicated by the configuration, and transmitting a V2X signal on the selected carrier, wherein the first service has a higher priority than a second service for the V2X signal.

The carrier may be a carrier separated by a greatest distance from the specific carrier.

The carrier may have a channel busy ratio (CBR) value less than or equal to a pre-configured threshold.

The carrier may be a carrier separated by a greatest distance from the specific carrier among carriers having the CBR value less than or equal to the threshold or a carrier randomly selected from among carriers conforming to a pre-configured ratio in a descending order of the measured CBR value.

The threshold may be configured based on a level of separation from the specific carrier, a type of the V2X signal, a priority of the V2X signal, or maximum transmit power allowed to V2X signal transmission.

The threshold may be configured to be low when a level of separation from the specific carrier is small, a priority of the V2X signal is low, or maximum transmit power allowed to the V2X signal transmission is great.

A resource used to transmit the V2X signal may be a resource not overlapping, on a time domain, with a resource reserved for the first service on the specific carrier.

A resource used to transmit the V2X signal may be a resource not overlapping, on a time domain, with a resource for transmitting specific signal transmission for the first service on the specific carrier.

The specific signal may be a physical sidelink broadcast channel (PSBCH) or a sidelink synchronization signal (SLSS).

In another aspect, a method for a vehicle to everything (V2X) operation of a user equipment (UE) in a wireless communication system is provided. The method comprises determining whether a first service is detected in a pre-configured carrier, measuring a first service-specific channel busy ratio (CBR), and performing the V2X operation in the carrier in a time duration in which the first service-specific CBR value is lower than a pre-configured threshold and the first service is not detected, and switching the carrier to a different carrier to perform the V2X operation in the different carrier in at least one of a time duration in which the first service is detected and a time duration in which the first service-specific CBR value is higher than the pre-configured threshold, wherein the first service has a higher priority than a second service for the V2X operation.

In another aspect, a method for a vehicle to every (V2X) operation of a user equipment (UE) in a wireless communication system is provided. The method comprises receiving a configuration indicating a first carrier from a network, and transmitting a V2X signal on the first carrier indicated by the configuration, wherein the V2X signal is transmitted within pre-configured maximum allowable transmit power, wherein the maximum allowable transmit power is limited within a range of allowable leakage power with respect to a second carrier on which the first service is transmitted or received, wherein the first service has a higher priority for the V2X signal than the second service, and wherein the first carrier is a carrier within a specific range in a frequency domain with respect to the second carrier.

The maximum allowable transmit power may be determined based on a separation level between the first carrier and the second carrier, a type of the V2X signal, a priority of the V2X signal, or a channel busy ratio (CBR) of the first carrier.

In another aspect, provided is user equipment (UE) comprising a transceiver transmitting and receiving a radio signal, and a processor operatively coupled with the transceiver, wherein the processor is configured to receive from a network a configuration for indicating a specific carrier on which a first service is transmitted or received, select a carrier from among carriers within a specific range in a frequency domain on the basis of the specific carrier indicated by the configuration, and transmit a V2X signal on the selected carrier, wherein the first service has a higher priority than a second service for the V2X signal.

V2X services may include a service having a relatively high priority among V2X services, and may also include a tolling service or a service to be protected or performed with a relatively high priority such as IEEE 802.11P-based DSRC or the like. Herein, there may be a case where signal transmission is necessarily performed for a service having a lower priority than the service to be protected in a carrier adjacent to a carrier on which the service having the relatively high priority is performed. In this case, according to the present description, the service having the relatively high priority and the carrier on which the service is provided can be sufficiently protected, and also signal transmission can be effectively performed for the service having the relatively low priority in the carrier adjacent to the carrier on which the service having the relatively high priority is performed.

DESCRIPTION OF EXEMPLARY EMBODIMENTS

Definitions of terms and abbreviations of terms in the specification to be described hereinafter may be defined in the 3GPP TS 36 series, unless otherwise specified.

Figure 1:
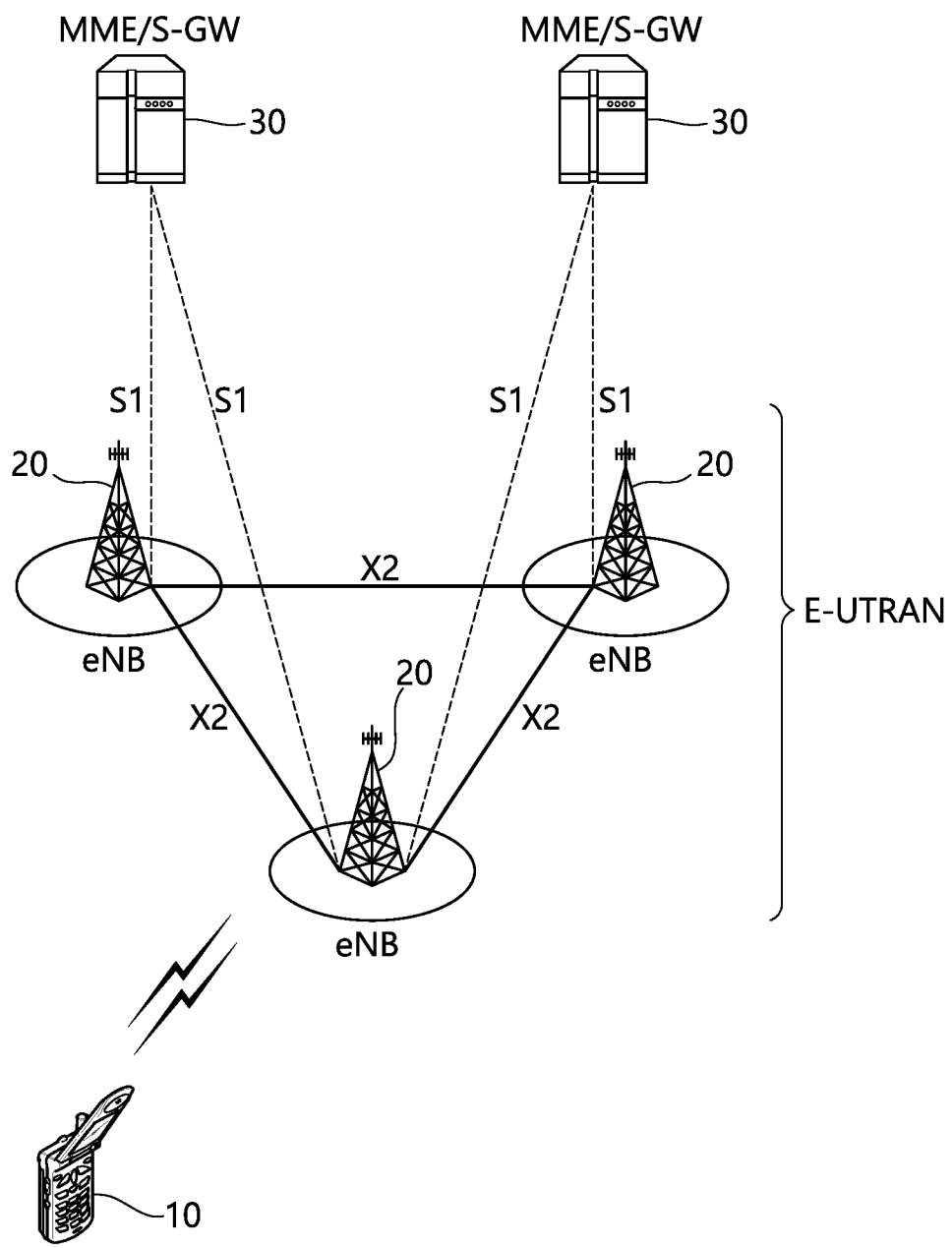
FIG. 1 shows a wireless communication system.

FIG. 1 shows a wireless communication system. The wireless communication system may be referred to as an Evolved-UMTS Terrestrial Radio Access Network (E-UTRAN) or a Long Term Evolution (LTE)/LTE-A system, for example.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
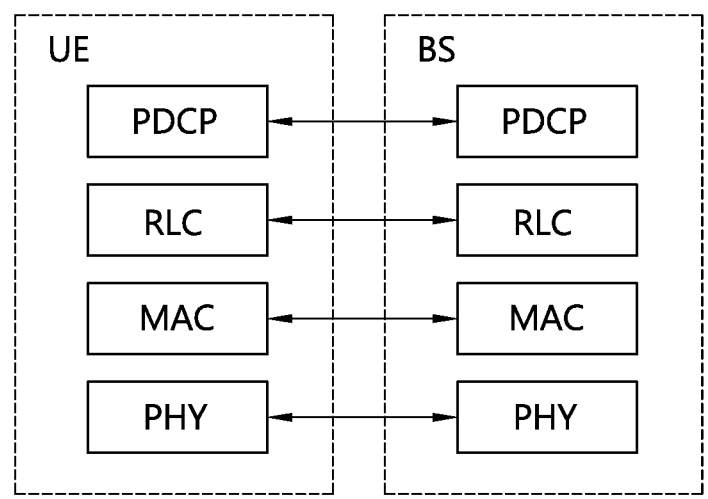
FIG. 2 is a diagram showing a wireless protocol architecture for a user plane.
Figure 3:
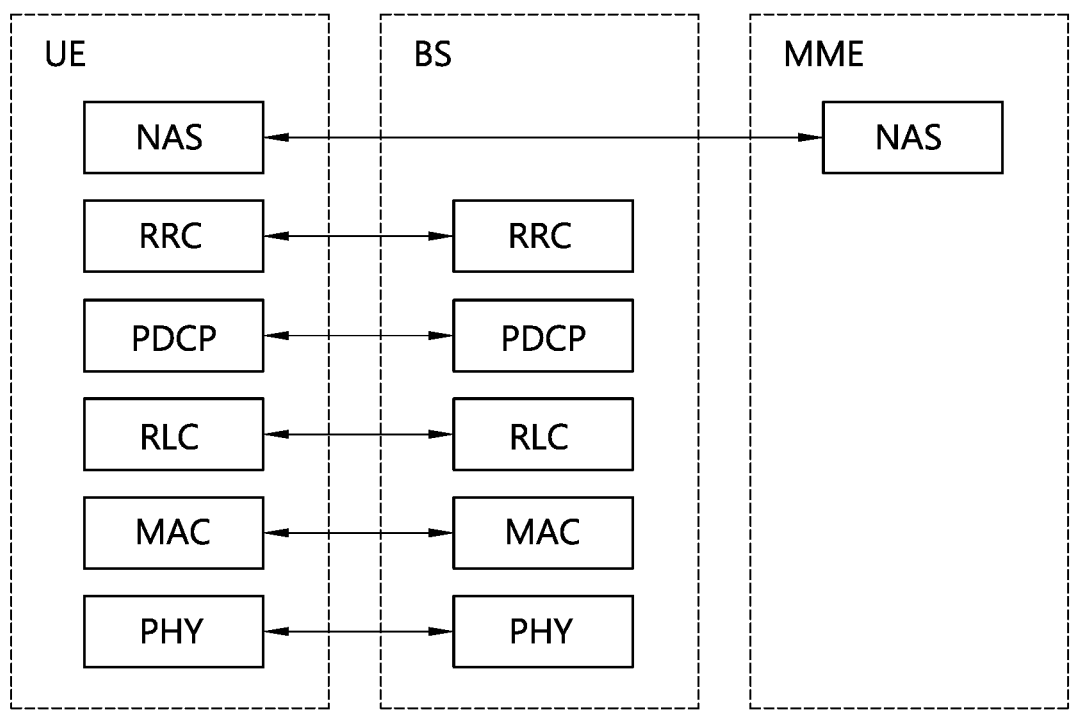
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

In what follows, a new radio access technology (RAT) will be described. The new radio access technology may also be called a new radio for short.

As more and more communication devices require a larger communication capacity, needs for improved mobile broadband communication over conventional radio access technologies (RATs) are emerging. Also, massive Machine Type Communication (MTC) which connects a plurality of devices and objects to each other and provides various services anytime and anywhere is also one of important issues that need to be considered in the next-generation communication. In addition, a new communication system design is under consideration, which takes into account services or terminals sensitive to reliability and latency; adoption of the next-generation radio access technology which supports enhanced mobile broadband communication, massive MTC, Ultra-Reliable and Low Latency Communication (URLLC), and so on is under consideration, which, for the purpose of convenience, is referred to as a new RAT or new radio (NR) in the present disclosure.

Figure 4:
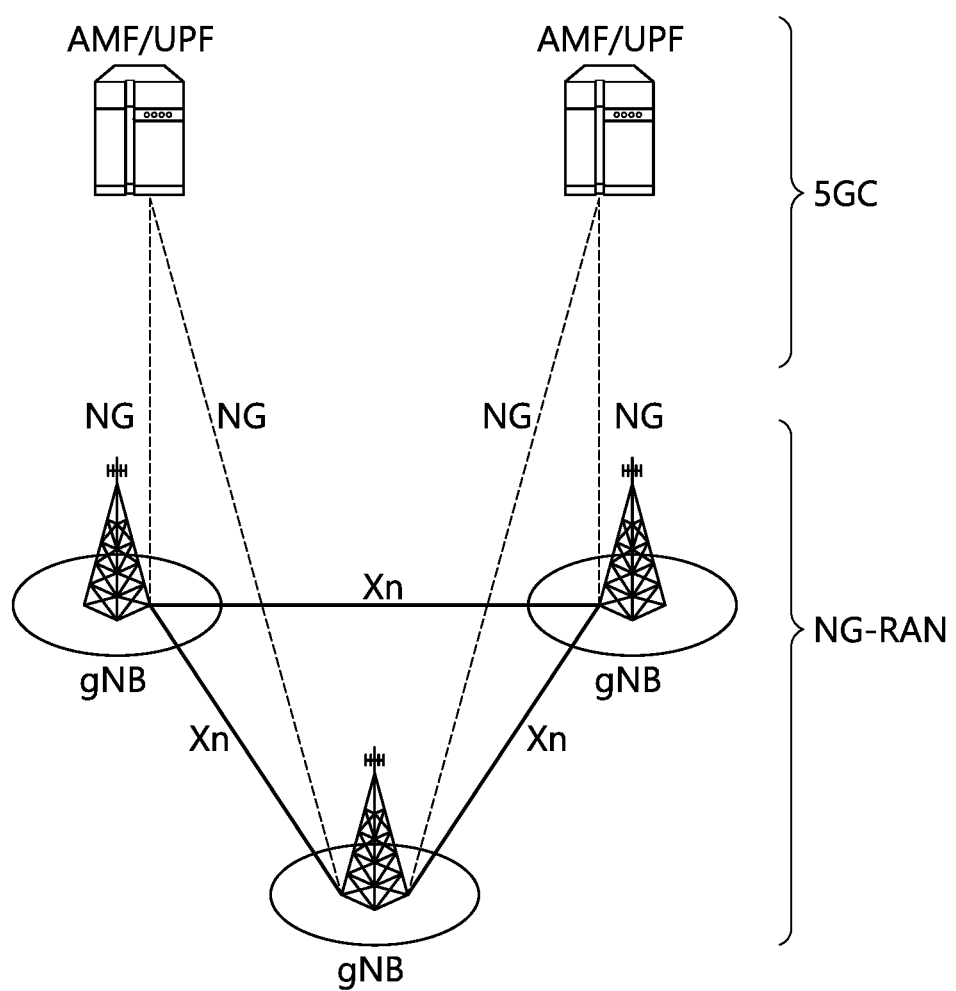
FIG. 4 illustrates a system structure of a new generation radio access network (NG-RAN) to which NR is applied.

FIG. 4 illustrates a system structure of a new generation radio access network (NG-RAN) to which NR is applied.

Referring to FIG. 4, NG-RAN may include a gNB and/or eNB which provides a UE with the user plane and control plane protocol termination. FIG. 4 illustrates the case where only the gNB is included. The gNB and the eNB are connected to each other through the Xn interface. The gNB and the eNB are connected to the 5G core network (5GC) through the NG interface. More specifically, the gNB and the eNB are connected to the access and mobility management function (AMF) through the NG-C interface and to the user plane function (UPF) through the NG-U interface.

Figure 5:
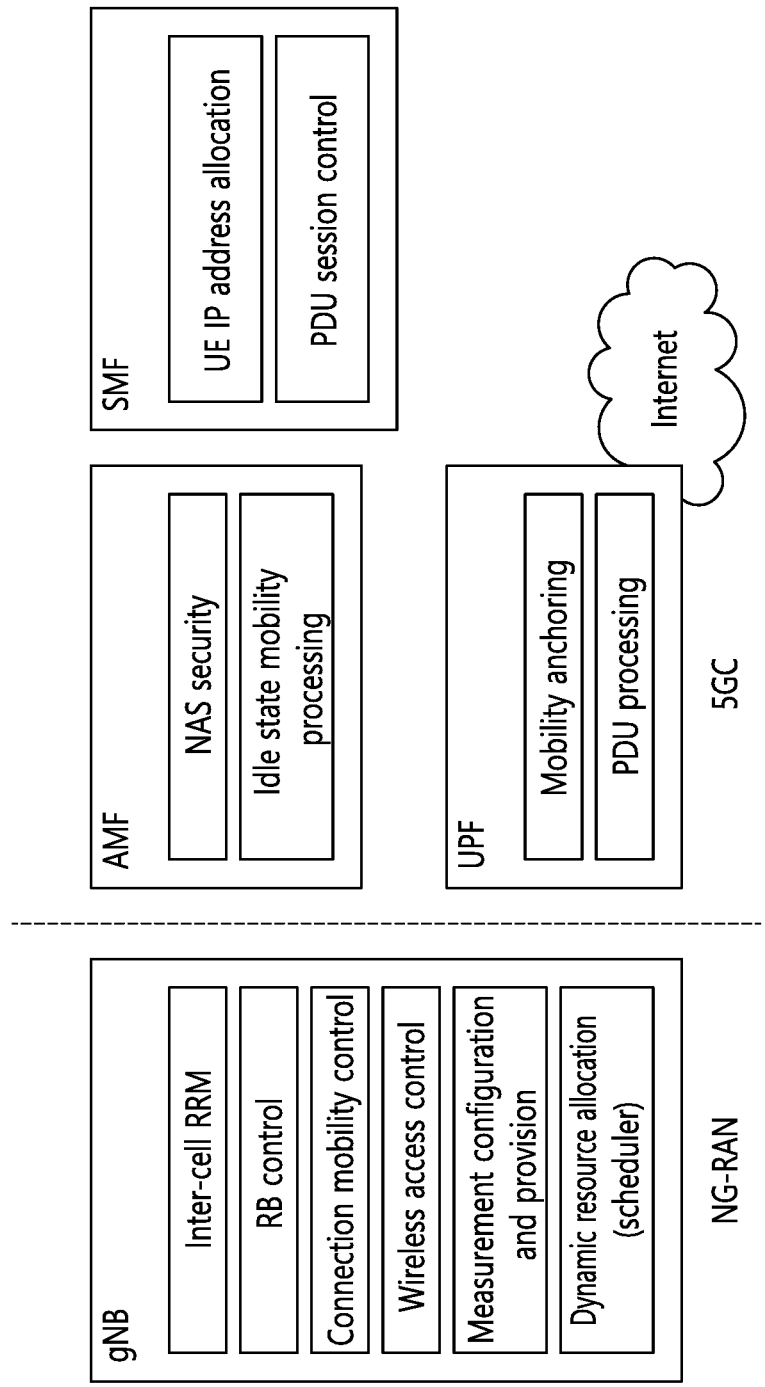
FIG. 5 illustrates a functional division between the NG-RAN and the 5 GC.

FIG. 5 illustrates a functional division between the NG-RAN and the 5GC.

Referring to FIG. 5, the gNB may provide functions such as inter-cell radio resource management (RRM), radio bearer (RB) management, connection mobility control, radio admission control, measurement configuration & provision, and dynamic resource allocation. The AMF may provide such functions as NAS security and idle state mobility processing. The UPF may provide such functions as mobility anchoring and PDU processing. The Session Management Function (SMF) may provide functions such as allocation of UE IP address and PDU session control.

Figure 6:
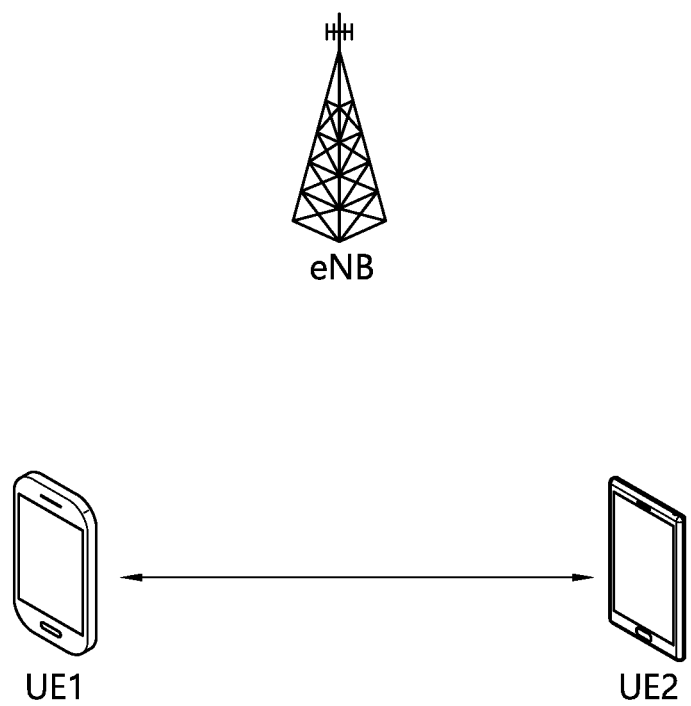
FIG. 6 illustrates UEs performing V2X or D2D communication.

FIG. 6 illustrates UEs performing V2X or D2D communication.

Referring to FIG. 6, in the V2X/D2D communication, the term UE primarily refers to a user terminal. However, when a network device such as an eNB transmits and receives a signal according to a communication scheme employed for UEs, the eNB may also be regarded as a kind of terminal.

UE 1 may operate to select a resource unit corresponding to a specific resource within a resource pool which is a set of series of resources and to transmit a D2D signal by using the corresponding resource unit. UE 2, which is a UE receiving the D2D signal, may be configured for a resource pool to which the UE 1 may transmit a signal and detect the signal transmitted from the UE 1 within the corresponding resource pool.

At this time, if the UE 1 is within coverage of an eNB, the eNB may inform the UE 1 of the resource pool. On the other hand, if the UE 1 lies outside the coverage of the eNB, other UE may inform the UE 1 of the resource pool, or a predetermined resource may be utilized.

In general, a resource pool consists of a plurality of resource units, and each UE may select one or more resource units to transmit its D2D signal.

Figure 7:
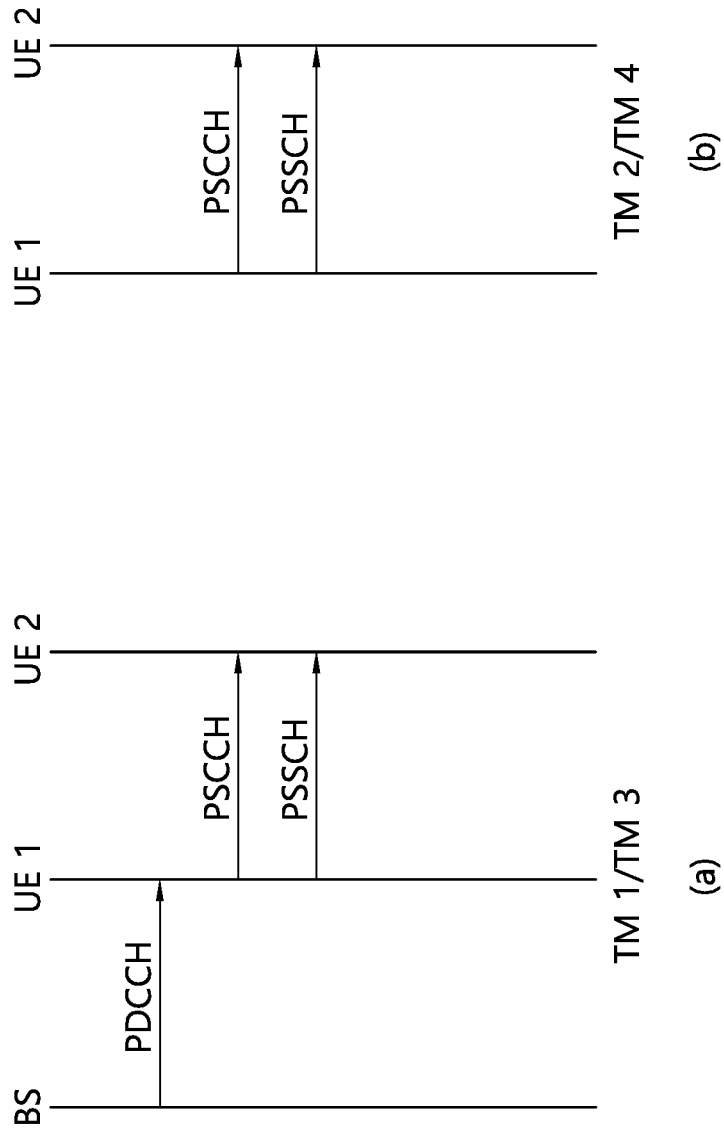
FIG. 7 illustrates a UE operation according to the transmission mode (TM) related to V2X/D2D communication.

FIG. 7 illustrates a UE operation according to the transmission mode (TM) related to V2X/D2D communication.

FIG. 7(*a*) is related to transmission mode 1, 3 while FIG. 7(*b*) is related to transmission mode 2, 4. In the transmission mode 1, 3, an eNB performs resource scheduling for UE 1 through PDCCH (more specifically, DCI), and the UE 1 performs D2D/V2X communication with UE 2 according to the corresponding resource scheduling. After transmitting Sidelink Control Information (SCI) to the UE 2 through a Physical Sidelink Control Channel (PSCCH), the UE 1 may transmit data based on the SCI through a Physical Sidelink Shared Channel (PSSCH). The transmission mode 1 may be applied to D2D communication while the transmission mode 3 may be applied to V2X communication.

The transmission mode 2, 4 may be referred to as a mode in which a UE performs scheduling autonomously. More specifically, the transmission mode 2 may be applied to D2D communication, and a UE may select a resource by itself within a set resource pool to perform a D2D operation. The transmission mode 4 may be applied to V2X communication, and a UE may select a resource by itself within a selection window through a process such as sensing/SA decoding, after which the UE may perform a V2X operation. After transmitting SCI to the UE 2 through the PSCCH, the UE 1 may transmit data based on the SCI through the PSSCH. In what follows, the transmission mode may be referred to as a mode.

While the control information transmitted by an eNB to a UE through the PDCCH is called downlink control information (DCI), the control information transmitted by a UE to other UEs through the PSCCH may be called SCI. The SCI may be expressed in various formats, for example, SCI format 0 and SCI format 1.

The SCI format 0 may be used for scheduling of the PSSCH. The SCI format 0 may include a frequency hopping flag (1 bit), resource block allocation and hopping resource allocation field (the number of bits of which may differ depending on the number of resource blocks of a sidelink), time resource pattern (7 bit), modulation and coding scheme (MCS) (5 bit), time advance indication (11 bit), and group destination ID (8 bit).

The SCI format 1 may be used for scheduling of the PSSCH. The SCI format 1 may include priority (3 bit), resource reservation (4 bit), frequency resource position of initial transmission and retransmission (the number of bits of which may differ depending on the number of sub-channels of a sidelink), time gap between initial transmission and retransmission (4 bit), MCS (5 bit), retransmission index (1 bit), and reserved information bit. In what follows, the reserved information bit may be called a reserved bit for short. Reserved bits may be added until the bit size of the SCI format 1 becomes 32 bit. In other words, the SCI format 1 includes a plurality of fields, each of which has different information from each other, where the number of remaining bits excluding the total number of bits of the plurality of fields from the total number of fixed bits (32 bit) of the SCI format 1 may be called reserved bits.

The SCI format 0 may be used for the transmission mode 1, 2 while the SCI format 1 may be used for the transmission mode 3, 4.

Figure 8:
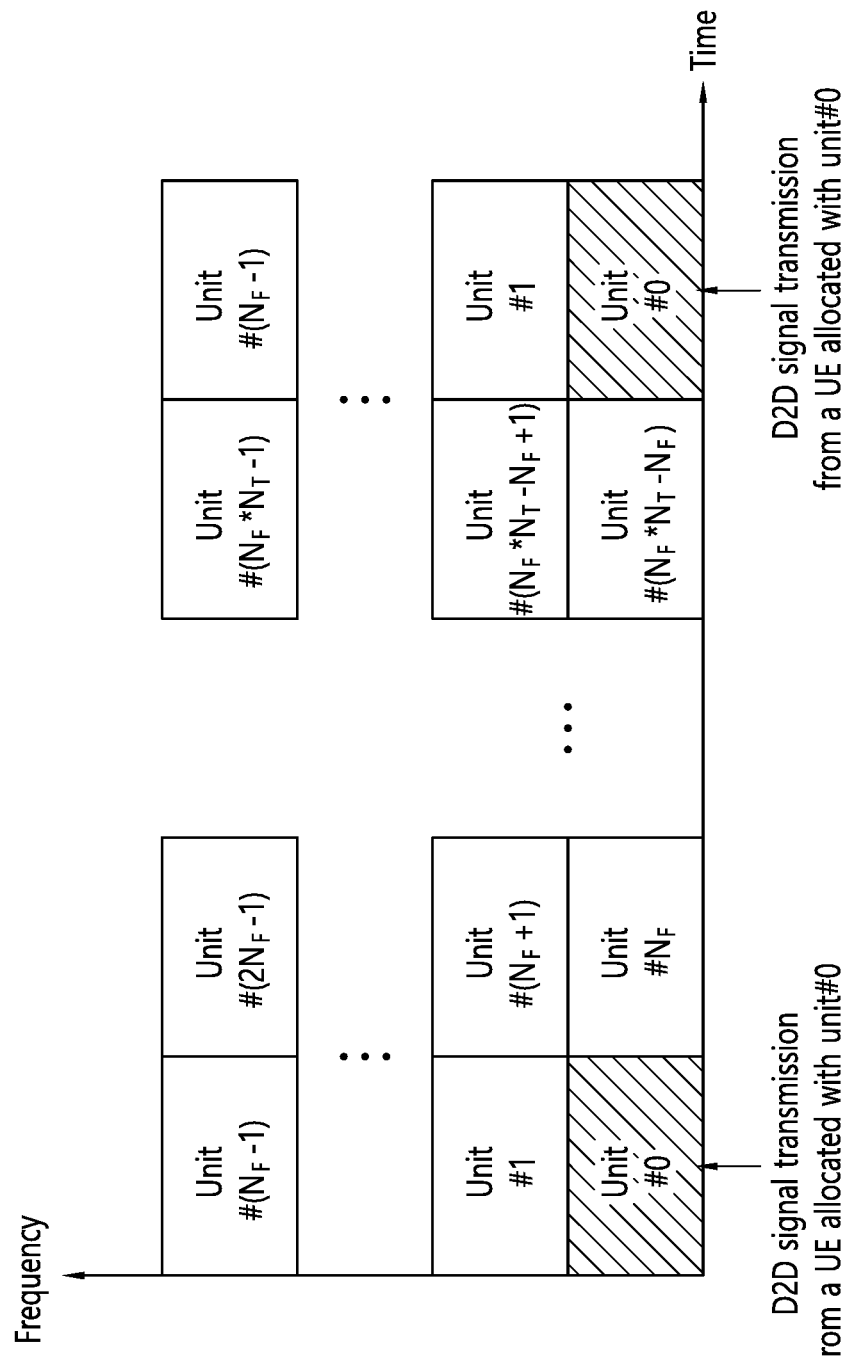
FIG. 8 illustrates an example of a configuration of resource units.

FIG. 8 illustrates an example of a configuration of resource units.

Referring to FIG. 8, the entire frequency resources of a resource pool may be divided into $N_F$ units, and the entire time resources of the resource pool may be divided into $N_T$ units, by which a total of $N_F*N_T$ resource units may be defined within the resource pool.

At this time, it is assumed that the corresponding resource pool is repeated with a period of $N_T$ subframes.

As shown in FIG. 8, one resource unit (for example, Unit #0) may appear repeatedly at regular intervals. Similarly, to obtain a diversity effect in the time or frequency dimension, the index of a physical resource unit to which one logical resource unit is mapped may vary according to a predetermined pattern as time elapses. In the aforementioned resource unit structure, a resource pool may indicate a set of resource units available for transmission, which may be used by a UE attempting to transmit a D2D signal.

A resource pool may be subdivided into various types. For example, the resource pool may be classified according to the content of a D2D signal transmitted from each resource pool. Each resource pool may be classified as follows, where each resource pool may transmit a D2D signal of which the content is described below.

1) Scheduling Assignment (SA) resource pool or D2D (sidelink) control channel: A resource pool by which each transmitting UE transmits a signal including information about the resource position of a D2D data channel transmitted from a succeeding or the same subframe and information required for demodulation of the other data channels (for example, information about modulation and coding scheme (MCS), MIMO transmission scheme, and timing advance).

The signal described in 1) may be transmitted together with D2D data after being multiplexed on the same resource unit. In this case, an SA resource pool may indicate a resource pool to which SA is transmitted by being multiplexed with D2D data. The SA resource pool may also be called a D2D (sidelink) control channel.

2) D2D data channel: A resource pool by which a transmitting UE transmits user data by using a resource designated through SA. If it is possible that D2D data and SA information are multiplexed and transmitted together on the same resource unit, a resource pool for a D2D data channel may transmit only the D2D data channel in such a way to exclude the SA information. In other words, the D2D data channel resource pool still uses the resource element which has been used for transmitting SA information on the basis of individual resource units within the SA resource pool.

3) Discovery channel: A resource pool for messages by which a transmitting UE transmits information such as its identity (ID) so that a neighboring UE may discover the transmitting UE.

Even if a D2D signal carries the same content as described above, a different resource pool may be utilized depending on the transmission and reception attributes of the D2D signal. As one example, even if the same D2D data channel or the same discovery message is transmitted, the resource pool may be further classified into another different resource pool depending on a scheme for determining transmission timing of the D2D signal (for example, whether the D2D signal is transmitted at the time of receiving a synchronization reference signal or transmitted after a predetermined timing advance is applied at the time of receiving the synchronization reference signal), resource allocation scheme (for example, whether a transmission resource of an individual signal is allocated by an eNB for each individual transmitting UE or whether an individual transmitting UE selects an individual signal transmission resource by itself within the resource pool), signal format (for example, the number of symbols occupied by each D2D signal in one subframe or the number of subframes used for transmission of one D2D signal), strength of a signal from the eNB, or transmission power intensity of a D2D UE).

As described above, the method in D2D communication for indicating a transmission resource of a D2D transmitting UE directly by the eNB may be called a mode 1 while the method for selecting a transmission resource directly by the UE, where a transmission resource region is predetermined or the eNB designates the transmission resource region, may be called a mode 2.

In the case of D2D discovery, the case where the eNB directly indicates a resource may be referred to as type 2 while the case where the UE directly selects a transmission resource from a predetermined resource region or a resource region indicated by the eNB may be referred to as type 1.

Meanwhile, the D2D may also be called sidelink. The SA may also be called a physical sidelink control channel (PSCCH), and D2D synchronization signal may also be called a sidelink synchronization signal (SSS). A control channel which transmits the most basic information before initiation of D2D communication is referred to as a physical sidelink broadcast channel (PSBCH), where the PSBCH may be transmitted together with an SSS and may alternatively called a physical D2D synchronization channel (PD2DSCH). A signal notifying that a specific UE is located in the vicinity may include an ID of the specific UE, and a channel to which such a signal is transmitted may be called a physical sidelink discovery channel (PSDCH).

In the D2D communication, only the D2D communication UE transmits a PSBCH together with an SSS, and in this reason, measurement of an SSS has been performed by using a demodulation reference signal (DM-RS) of the PSBCH. A UE in the out-coverage area may measure the DM-RS of the PSBCH and measure reference signal received power (RSRP) of the signal to determine whether the UE itself operate as a synchronization source.

Hereinafter, the sidelink RSSI (Sidelink Received Signal Strength Indicator; S-RSSI), PSSCH Reference Signal Received Power (PSSCH-RSRP), Channel Busy Rate (CHANNEL BUSY RATIO; CBR), Channel Occupancy Rate (CHANNEL OCCUPANCY RATIO (CR) will be described.

<S-RSSI>

Sidelink RSSI (S-RSSI) may be defined as the linear average of the total received power (in [W]) per SC-FDMA symbol observed by the UE only in the configured sub-channel in SC-FDMA symbols 1, 2, . . . , 6 of the first slot and SC-FDMA symbols 0, 1, . . . , 5 of the second slot of a subframe.

Herein, the reference point for the S-RSSI may be the antenna connector of the UE.

If receiver diversity is in use by the UE, the reported value may not be lower than the corresponding S-RSSI of any of the individual diversity branches.

S-RSSI is applicable for RRC_IDLE intra-frequency, RRC_IDLE inter-frequency, RRC_CONNECTED intra-frequency, and/or RRC_CONNECTED inter-frequency.

<PSSCH-RSRP>

PSSCH Reference Signal Received Power (PSSCH-RSRP) may be defined as the linear average over the power contributions (in [W]) of the resource elements that carry demodulation reference signals associated with PSSCH, within the PRBs indicated by the associated PSCCH.

Herein, the reference point for the PSSCH-RSRP may be the antenna connector of the UE.

If receiver diversity is in use by the UE, the reported value may not be lower than the corresponding PSSCH-RSRP of any of the individual diversity branches.

PSSCH-RSRP is applicable for RRC_IDLE intra-frequency, RRC_IDLE inter-frequency, RRC_CONNECTED intra-frequency, and/or RRC_CONNECTED inter-frequency.

Herein, the power per resource element may be determined from the energy received during the useful part of the symbol, excluding the CP.

<CBR>

Channel busy ratio (CBR) measured in subframe n is defined as follows.

For PSSCH, CBR may be the portion of sub-channels in the resource pool whose S-RSSI measured by the UE exceed a (pre-)configured threshold sensed over subframes [n−100, n−1].

For PSCCH, in a pool (pre)configured such that PSCCH may be transmitted with its corresponding PSSCH in non-adjacent resource blocks, CBR may be the portion of the resources of the PSCCH pool whose S-RSSI measured by the UE exceed a (pre-)configured threshold sensed over subframes [n−100, n−1], assuming that the PSCCH pool is composed of resources with a size of two consecutive PRB pairs in the frequency domain.

CBR is applicable for RRC_IDLE intra-frequency, RRC_IDLE inter-frequency, RRC_CONNECTED intra-frequency, and/or RRC_CONNECTED inter-frequency.

Herein, the subframe index may be based on physical subframe index.

<CR>

Channel occupancy ratio (CR) evaluated at subframe n may be defined as follows.

CR may be the total number of sub-channels used for its transmissions in subframes [n−a, n−1] and granted in subframes [n, n+b] divided by the total number of configured sub-channels in the transmission pool over [n−a, n+b].

CR is applicable for RRC_IDLE intra-frequency, RRC_IDLE inter-frequency, RRC_CONNECTED intra-frequency, and/or RRC_CONNECTED inter-frequency.

Herein, a may be a positive integer and b may be 0 or a positive integer. a and b may be determined by UE implementation with a+b+1=1000, a>=500, and n+b should not exceed the last transmission opportunity of the grant for the current transmission.

Herein, CR may be evaluated for each (re)transmission.

Herein, in evaluating CR, the UE may assume the transmission parameter used at subframe n is reused according to the existing grant(s) in subframes [n+1, n+b] without packet dropping.

Herein, the subframe index may be based on physical subframe index.

Herein, CR can be computed per priority level.

Hereinafter, the present description will be described in greater detail.

For example, schemes proposed below provide a method for effectively protecting a (specific) service on a pre-configured(/signaled) specific carrier. Herein, for example, a V2X communication mode may be (representatively) classified into: (A) a mode (MODE #3) in which V2X message transmission(/reception)-related scheduling information is signaled(/controlled) by a BS (on a V2X resource pool pre-configured(/signaled) (from the BS(/network))) (e.g., a UE (in an RRC_CONNECTED state) is a primary target); and/or (B) a mode (MODE #4) in which V2X message transmission(/reception)-related scheduling information is (independently) signaled(/controlled) by a UE (on a V2X resource pool pre-configured(/signaled) (from the BS(/network))) (e.g., a UE located inside/outside communication coverage of the BS (and/or in an RRC_CONNECTED/RRC_IDLE state) is a primary target). Herein, for example, in the present description, the wording "sensing operation" may be interpreted as a PSSCH-RSPR measurement operation based on a PSCCH demodulation reference signal (DM-RS) sequence (scheduled by a PSCCH of which decoding is successful) and/or an S-RSSI measurement operation (based on a sub-channel related to a V2X resource pool). Herein, for example, in the present description, the wording "reception" may be (extendedly) interpreted as (at least) one of: (A) a V2X channel(/signal) (e.g., PSCCH, PSSCH, PSBCH, PSSS/SSSS, etc.) decoding(/reception) operation (and/or a WAN(Wide Area Network) DL channel (/signal) (e.g., PDCCH, PDSCH, PSS/SSS, etc.) decoding (/reception) operation); and/or (B) a sensing operation; and/or (C) a CBR measurement operation. Herein, for example, in the present description, the wording "transmission" may be (extendedly) interpreted as a V2X channel(/signal) (e.g., PSCCH, PSSCH, PSBCH, PSSS/SSSS, etc.) transmission operation (and/or a WAN UL channel(/signal) (e.g., PUSCH, PUCCH, SRS, etc.) transmission operation). Herein, for example, in the present description, the wording "carrier" may be (extendedly) interpreted as: (A) a pre-configured(/signaled) carrier set(/group); and/or (B) a V2X resource pool or the like. Herein, definitions on the PSSCH-RSRP, S-RSSI, CBR, and CR may be the same as described above.

Abbreviations used in this specification are described as follows.

For convenience of description, a pre-configured(/signaled) specific carrier to be protected (with a relatively high priority) and a specific service on the specific carrier are respectively named H_CARRIER and H_SERVICE. Herein, for example, the (corresponding) H_SERVICE may be a tolling service or an IEEE 802.110 based DSRC (Dedicated Short Range Communication) service or the like. Herein, for example, compared to the H_SERVICE, a service having a relatively low priority (in terms of protection) is named L_SERVICE.

Hereinafter, a method proposed in the present description will be described.

Among services provided on a specific carrier adjacent to a carrier on which a UE intends to perform a V2X operation, there may be a service (e.g., a tolling service, etc.) to be protected or performed with a relatively high priority such as the H_SERVICE. In addition, since a V2X operation using an intelligent transport system (ITS) band of 5.9 GHz is considered in LTE cellular-V2X (C-V2X), there may be a problem in IEEE 802.11P-based collision with dedicated short range communication (DSRC) which is different-type wireless communication using the same frequency band and leakage interference or the like caused by an V2X operation performed on an adjacent carrier. Herein, the DSRC service may also be a service (e.g., H_SERVICE) to be protected or performed with the relatively high priority. In addition, herein, the adjacent carrier may mean not only contiguous carriers on a frequency band but also non-contiguous carriers.

As described above, there may be a case where the UE has to perform the V2X operation on a carrier adjacent to a carrier (e.g., H_CARRIER) for providing a service having a relatively high priority such as the tolling service or the DSRC-based service or the like. Herein, there may be a problem in a method of performing the V2X operation in consideration of leakage interference on the H_CARRIER on the pre-configured carrier when the adjacent carrier is pre-configured, and a method of selecting a carrier for performing the V2X operation capable of decreasing leakage interference on the H_CARRIER when there are a plurality of carriers adjacent to the H_CARRIER. Accordingly, the present description proposes a method for solving the above problem.

Figure 9:
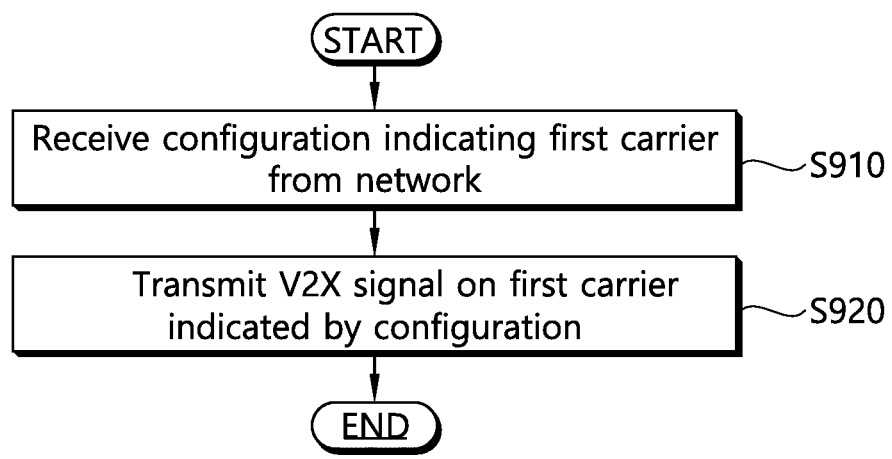
FIG. 9 shows an example of a method for a V2X operation of a UE according to an embodiment of the present description.

FIG. 9 shows an example of a method for a V2X operation of a UE according to an embodiment of the present description.

Referring to FIG. 9, the UE receives a configuration indicating a first carrier from a network (S910).

Thereafter, a V2X signal is transmitted on the first carrier indicated by the configuration (S920). Herein, the V2X signal may be transmitted within pre-configured maximum allowable transmit power. In addition, herein, the maximum allowable transmit power may be limited within a range of allowable leakage power with respect to a second carrier on which the first service is transmitted or received. In addition, herein, the first service may have a higher priority for the V2X signal than the second service. In addition, herein, the first carrier may be a carrier within a specific range in a frequency domain with respect to the second carrier.

In addition, herein, the maximum transmit power may be determined based on a separation level between the first carrier and the second carrier, a type of the V2X signal, a priority of the V2X signal, or a channel busy ratio (CBR) of the first carrier.

Further, a specific example thereof may be as follows.

(Rule #A) When a V2X UE performs a transmission operation on an adjacent carrier (e.g., carrier #X) of H_CARRIER, (some of) the following rules may be applied to restrict leakage interference (or power) entering the H_CARRIER.

A maximum allowable transmit power value on the carrier #X or a maximum allowable leakage interference (or power) value or the like with respect to the H_CARRIER may be pre-configured(/signaled).

Herein, for example, the parameter value may be configured(/signaled) differently according to: (1) a (frequency) separation level between the carrier #X and the H_CARRIER; or (2) a V2X message feature/type and transmission parameter(/form) to be transmitted on the carrier #X (e.g., service priority (/PPPP(ProSe priority per packet)), transmission/message generation/resource reservation periodicity, etc.); or (3) a CBR(/CR) measurement value or the like of the carrier #X.

Herein, for example, the smaller the (frequency) separation between the carrier #X and the H_CARRIER, or the lower the service priority of a V2X message to be transmitted on the carrier #X (or the shorter the transmission (/message generation) periodicity), or the greater the CBR measurement value of the carrier #X, the smaller the parameter value may be configured(/signaled).

In other words, when a specific carrier on which the UE intends to transmit the V2X signal is pre-configured as a carrier adjacent to the H_CARRIER, it may be necessary to protect the H_SERVICE provided on the H_CARRIER by reducing leakage interference caused by the V2X signal transmission. Herein, a maximum allowable transmit power value or maximum allowable leakage power value for a transmission operation on the specific carrier may be pre-configured. Accordingly, the UE may perform the transmission operation satisfying the maximum allowable transmit power value or the maximum allowable leakage power value with respect to the V2X signal. As a result, a level of leakage interference on the H_CARRIER can be reduced.

In addition, herein, the maximum allowable transmit power value or the maximum allowable leakage power value may be configured differently according to a frequency separation level between the pre-configured carrier and the H_CARRIER, a type of the V2X signal, and a CBR measurement value in the pre-configured carrier. For example, when the V2X signal is a signal having a relatively low priority, the maximum allowable transmit power value for the V2X signal may be configured to be low.

Figure 10:
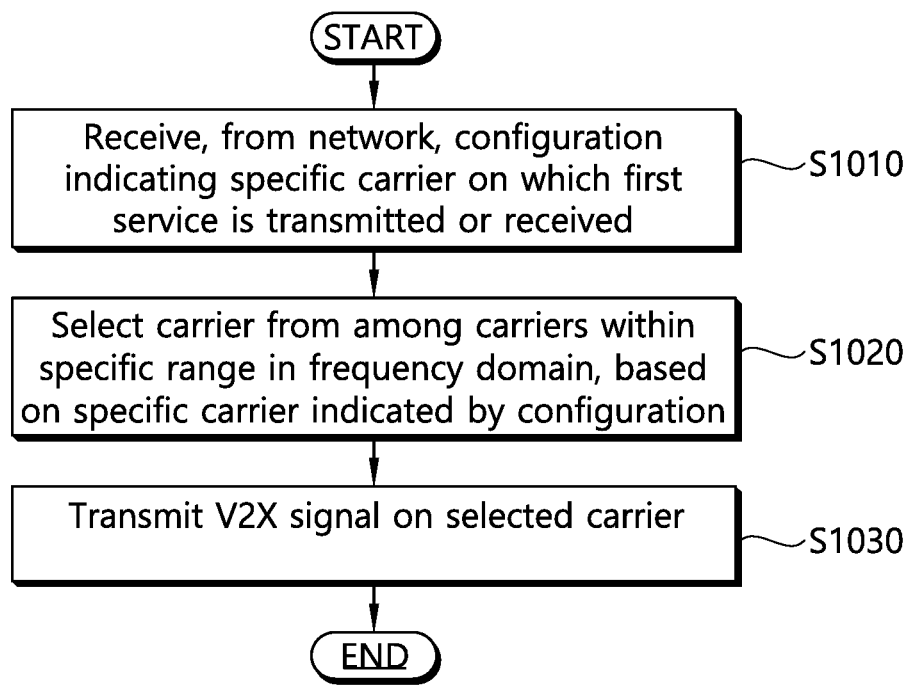
FIG. 10 shows an example of a method for a V2X operation of a UE according to another embodiment of the present description.

FIG. 10 shows an example of a method for a V2X operation of a UE according to another embodiment of the present description.

Referring to FIG. 10, the UE receives from a network a configuration indicating a specific carrier on which a first service is transmitted or received (S1010).

Thereafter, a carrier is selected from among carriers within a specific range in a frequency domain on the basis of the specific carrier indicated by the configuration (S1020).

Thereafter, a V2X signal is transmitted on the selected carrier (S1030).

Herein, the first service may have a higher priority than a second service for the V2X signal.

In addition, herein, the carrier may be a carrier separated by a greatest distance from the specific carrier.

In addition, herein, the carrier may have a CBR value less than or equal to a pre-configured threshold.

In addition, herein, the carrier may be a carrier separated by a greatest distance from the specific carrier among carriers having the CBR value less than or equal to the threshold or a carrier randomly selected from among carriers conforming to a pre-configured ratio in a descending order of the measured CBR value.

In addition, herein, the threshold may be configured based on a level of separation from the specific carrier, a type of the V2X signal, a priority of the V2X signal, or maximum transmit power allowed to V2X signal transmission.

In addition, herein, the threshold may be configured to be low when a level of separation from the specific carrier is small, a priority of the V2X signal is low, or maximum transmit power allowed to the V2X signal transmission is great.

In addition, herein, a resource used to transmit the V2X signal may be a resource not overlapping, on a time domain, with a resource reserved for the first service on the specific carrier.

In addition, herein, a resource used to transmit the V2X signal may be a resource not overlapping, on a time domain, with a resource for transmitting specific signal transmission for the first service on the specific carrier.

In addition, herein, the specific signal may be a physical sidelink broadcast channel (PSBCH) or a sidelink synchronization signal (SLSS).

Further, a specific example thereof may be as follows.

(Rule #B) When a V2X UE has to select an adjacent carrier of H_CARRIER as a TX carrier, (some of) the following rules may be applied.

(B-1) A carrier having a great (frequency) separation from the H_CARRIER is preferentially selected.

An adjacent carrier having a CBR measurement value less than or equal to a pre-configured(/signal) threshold is selected (or only the adjacent carrier having the CBR measurement value less than or equal to the pre-configured(/signaled) threshold is (limitedly) considered).

Herein, for example, it may be regarded that the adjacent carrier having a CBR measurement value greater than the threshold has already caused great (or allowable) leakage interference (or power) on H_CARRIER. Therefore, when selecting a TX carrier, an adjacent carrier having a CBR measurement value less than or equal to the threshold may be preferentially selected or (limitedly) considered.

Herein, for example, the threshold may be configured(/signaled) differently according to: (1) a (frequency) separation level from the H_CARRIER; or (2) a V2X message feature/type and transmission parameter(/form) to be transmitted (or allowed to be transmitted); or (3) a (maximum allowable) transmit power value or the like.

Herein, for example, the smaller the (frequency) separation from the H_CARRIER, or the lower the service priority of a V2X message to be transmitted (or allowed to be transmitted) (or the shorter the TX (/message generation) periodicity), or the greater the (maximum allowable) transmit power value, the smaller the threshold may be configured(/signaled).

Herein, for example, among adjacent carriers having a CBR measurement value less than or equal to the threshold, an adjacent carrier may be selected as follows: (1) it is randomly selected (from lower Q % (of CBR measurement values); (2) a carrier having a lowest CBR measurement value is selected; or (3) a carrier having a great (frequency) separation from the H_CARRIER is preferentially selected.

In other words, when a UE is capable of selecting a carrier for transmitting a V2X signal, there may be a case where the carrier for transmitting the V2X signal has to be selected from among a plurality of carriers adjacent to an H_CARRIER. Herein, the UE may select a carrier separated by a greatest distance from the H_CARRIER on a frequency domain. The greater the separation distance on the frequency domain between an aggressor carrier and a victim carrier, the smaller the leakage power amount between the both carriers. The UE selects the carrier separated by a greatest distance from the H_CARRIER on the frequency domain as the carrier for transmitting the V2X signal, thereby decreasing a level of leakage power or leakage interference on the H_CARRIER, which occurs due to V2X signal transmission on the selected carrier.

Alternatively, the UE may select a carrier having a CBR measurement value less than or equal to a pre-configured threshold. Herein, if a plurality of carriers have the CBR measurement value less than or equal to the threshold, the UE may select a carrier having a lowest CBR measurement value, a carrier having a greatest frequency separation, or a carrier randomly selected from among carriers conforming to a pre-configured ratio in an ascending order of the measured CBR values. As described above, the CBR is a ratio of a sub-channel in a resource pool in which a sidelink-RSSI measured by the UE exceeds a specific threshold, and may mean that the higher the CBR value, the higher the (average) load state of the resource pool. Accordingly, a carrier having a high CBR value may have much greater effect on leakage interface with respect to an adjacent carrier. Herein, the UE may reduce a level of leakage interference on the adjacent carrier, by selecting a carrier having a CBR measurement value less than or equal to a pre-configured threshold as a carrier for V2X signal transmission.

Figure 11:
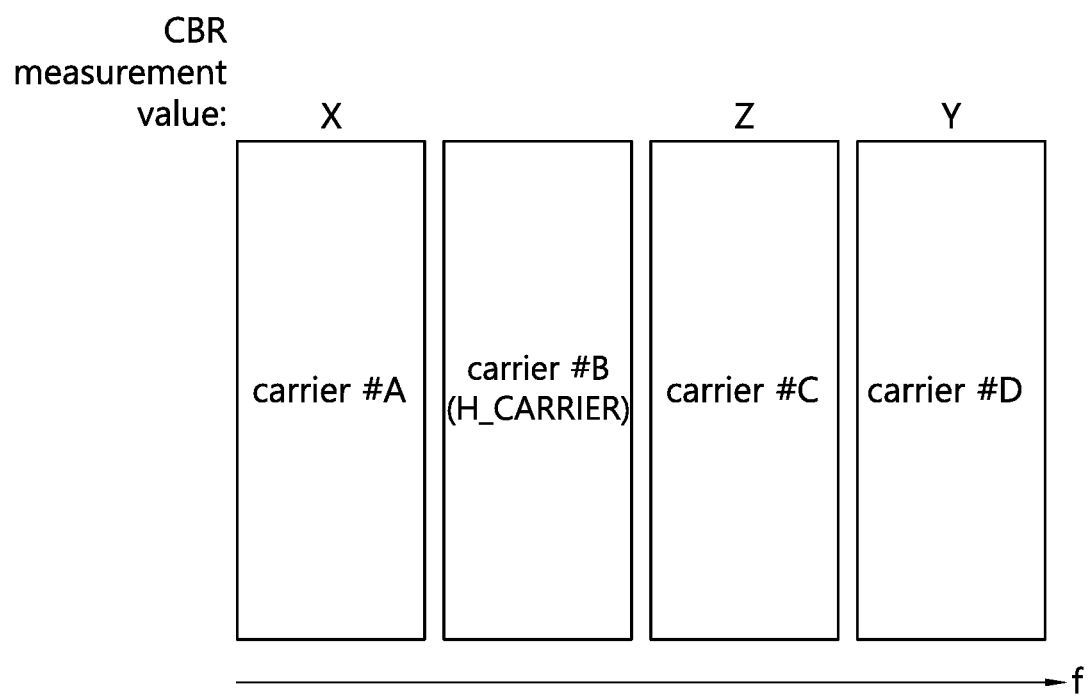
FIG. 11 briefly shows an example of a method for a V2X operation of a UE according to (rule #B).

FIG. 11 briefly shows an example of a method for a V2X operation of a UE according to (rule #B).

Referring to FIG. 11, a carrier #A, a carrier #B, a carrier #C, and a carrier #D may exist in an orderly manner in a frequency band. Herein, when a service (e.g., H_SERVICE) having a relatively high priority is provided on the carrier #B, if the carrier #B is the H_CARRIER, there may be a case where one carrier is selected from among the carrier #A and carrier #C, adjacent to the carrier #B, and the carrier #D to perform the V2X operation on the selected carrier. That is, the carrier #A, the carrier #C, and the carrier #D may be candidate carriers on which the UE can perform the V2X operation. Herein, as described above, the adjacent carrier may include a contiguous carrier and a non-contiguous carrier in the frequency and.

Herein, the UE may select the carrier #D having the greatest frequency separation from the carrier #B.

In addition, herein, for example, when a CBR measurement value for each carrier is X in the carrier #A, Z in the carrier #C, and Y in the carrier #D, and a pre-configured CBR threshold is T where X<Y<T<Z, the UE may select the carrier #A and carrier #D having a CBR measurement value less than the pre-configured threshold T. Herein, for example, when the UE selects a carrier having a lowest CBR measurement value from among carriers having a CBR measurement value less than or equal to the pre-configured threshold, the UE may select the carrier #A.

In addition, the following proposed method may be considered.

(Rule #C) When a V2X UE selects(/reserves) a TX resource (in a pool) on an adjacent carrier (carrier #Y) of H_CARRIER, (some of) the following rules may be applied.
 (C-1) A resource not overlapping, on a time domain, with (TX and/or RX) pool related to H_SERVICE on H_CARRIER (or a resource selected(/reserved) by H_SERVICE on H_CARRIER) is preferentially selected(/reserved).
 (C-2) A resource not overlapping, on a time domain, with a specific (primary) signal(/channel) TX(/RX) resource (e.g., SLSS(/PSBCH) resource, etc.) related to H_SERVICE on H_CARRIER is preferentially selected(/reserved).

In other words, according to the (rule #C), when the V2X signal is transmitted on a carrier adjacent to the H_CARRIER, the V2X signal may be transmitted by selecting a resource not overlapping, on a time domain, with a resource for providing the H_SERVICE in terms of transmission resource allocation. Herein, when the transmission resource is selected, it is possible to select not only the resource for providing the H_SERVICE but also a resource not overlapping, on the time domain, with a resource for transmitting or receiving a pre-configured specific signal such as a sidelink synchronization signal (SLSS) related to the H_SERVICE. Unlike the (rule #A) and (rule #B) described above in terms of transmit power on an adjacent carrier or carrier selection on a frequency domain, (rule #C) can decrease leakage interference by selecting a resource not overlapping, on the time domain, with the resource for providing the H_SERVICE.

In addition, the following proposed method may be considered.

Figure 12:
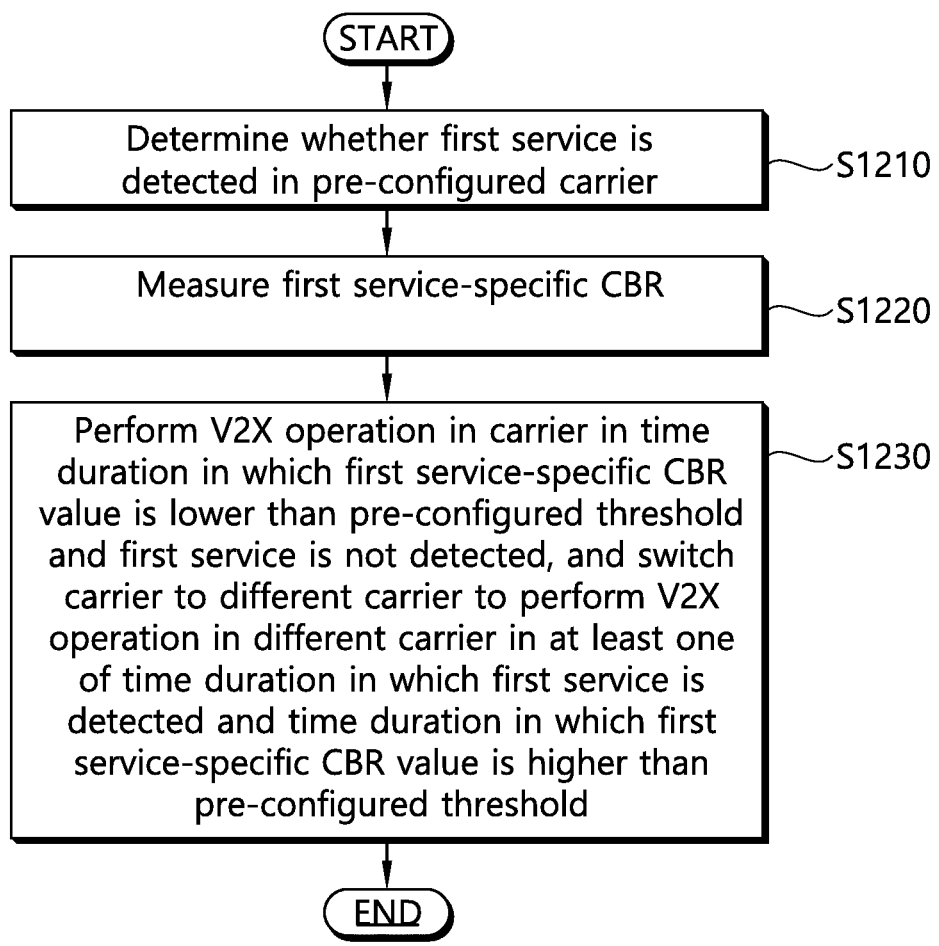
FIG. 12 shows an example for a method for a V2X operation of a UE according to another embodiment of the present description.

FIG. 12 shows an example for a method for a V2X operation of a UE according to another embodiment of the present description.

Referring to FIG. 12, the UE determines whether a first service is detected in a pre-configured carrier (S1210).

In addition, a first service-specific CBR is measured (S1220).

Thereafter, in a time duration in which the first service-specific CBR value is lower than a pre-configured threshold and the first service is not detected, the V2X operation is performed in the carrier, and in at least one of a time duration in which the first service is detected and a time duration in which the first service-specific CBR value is higher than the pre-configured threshold, the carrier is switched to a different carrier to perform the V2X operation in the different carrier (S1230). Herein, the first service may have a higher priority than a second service for the V2X operation.

Further, a specific example thereof may be as follows.
 (Some of) the above rules may be (limitedly) applied only when H_SERVICE is (actually) detected on H_CARRIER (e.g., when H_SERVICE is detected, (some of) the above rules may be applied during a pre-configured (/signaled) specific time(/period)).
 To protect H_SERVICE on H_CARRIER, a V2X UE may be allowed to perform a TX carrier switching operation (on another (adjacent) carrier except for H_CARRIER) (or not to select H_CARRIER).

Herein, for example, the aforementioned condition may be a case where an H_SERVICE-specific (or H_CARRIER-specific) CBR measurement value is higher than a pre-configured(/signaled) threshold.

Herein, for example, the aforementioned condition may be a case where an H_SERVICE is (actually) detected on an H_CARRIER.

In other words, the UE may determine whether the H_SERVICE is provided on the carrier for transmitting the V2X signal, and may measure an H_SERVICE-specific CBR value, so that the UE transmits the V2X signal on the pre-configured carrier only when the H_SERVICE is not provided and the H_SERVICE-specific CBR value is lower than a pre-configured threshold. Herein, when the H_SERVICE is provided on the pre-configured carrier in unit of a specific time interval or period, in case (1) of a time duration in the H_SERVICE is not provided and the H_SERVICE-specific CBR value is lower than the pre-configured threshold, the UE may transmit the V2X signal in the pre-configured carrier, and in case (2) of a time duration in which the H_SERVICE is provided or the H_SERVICE-specific CBR value is higher than the pre-configured threshold, the UE may switch from the pre-configured carrier to an adjacent different carrier, and may transmit the V2X signal on the switched carrier. Accordingly, during the H_SERVICE is provided on the pre-configured carrier, it is possible to protect the H_SERVICE by transmitting the V2X signal on a carrier other than the H_CARRIER. In addition, since the pre-configured carrier is used as a carrier for transmitting the V2X signal during the H_SERVICE is not provided on the pre-configured carrier, the V2X signal can be more effectively transmitted in terms of dynamic carrier sharing.

Figure 13:
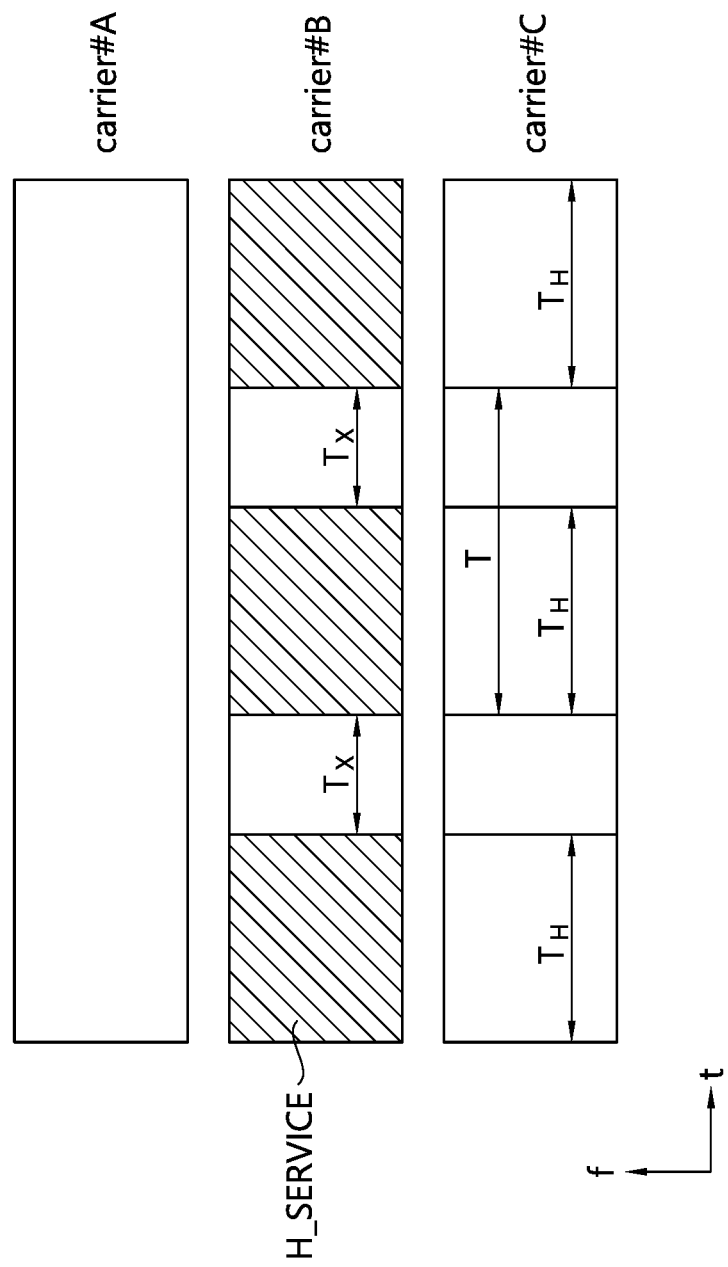
FIG. 13 briefly shows an example of a method for a V2X operation of a UE according to the embodiment of FIG. 12.

FIG. 13 briefly shows an example of a method for a V2X operation of a UE according to the embodiment of FIG. 12.

Referring to FIG. 13, a carrier #B may be an H_CARRIER for providing an H_SERVICE, and a carrier #A and a carrier #C may be carriers adjacent to the carrier #B. Herein, the H_SERVICE may be provided at a specific time period T of FIG. 13. That is, according to FIG. 13, the H_SERVICE may be provided for a time duration $T_M$ in unit of the period T on the carrier #B, and may not be provided for a time duration $T_X$. Herein, $T=T_X+T_H$. In addition, herein, in addition to the carrier #B, the carrier #A and the carrier #C may be carrier candidates on which the UE may transmit the V2X signal.

Herein, the UE may determine whether the H_SERVICE is provided on the carrier #B. Herein, there is a case (1) where the UE may transmit the V2X signal on the carrier #B since the H_SERVICE is not provided on the carrier #B in a time duration $T_X$, and a case (2) where the UE may perform switching to another carrier adjacent to the carrier #B and may transmit the V2X signal on the switched carrier since the H_SERVICE is provided on the carrier #B in a time duration $T_H$. Herein, the switched carrier may be the carrier #A or the carrier #C.

Herein, when the UE determines a carrier to be switched, the aforementioned rules may be applied. For example, in FIG. 13, when the carrier #C has a lower CBR value measured for each carrier than the carrier #A, the UE may determine the to-be-switched carrier as the carrier #C. Herein, the UE may transmit the V2X signal on the carrier #C in the duration $T_H$, and may transmit the V2X signal on the carrier #B in the duration $T_X$.

Meanwhile, although only whether the H_SERVICE is detected is taken for example in the present drawing, switching may be performed according to whether the H_SERVICE-specific CBR value is higher than a pre-configured threshold as described above. In addition, herein, although it is not explicitly shown in FIG. 13, when the UE determines a carrier to be switched, a carrier having a greatest separation distance from the H_CARRIER may be selected.

Examples for the aforementioned proposed scheme can be included as one of implementation methods of the present description, and thus can be apparently regarded as a sort of proposed methods. In addition, although the aforementioned proposed schemes can be independently implemented, it is also possible to be implemented by combining (or merging) some proposed schemes.

For example, although the proposed scheme has been described based on the 3GPP LTE system for convenience of explanation, the range of applying the proposed scheme of the present description can also be extended to another system other than the 3GPP LTE system.

For example, the proposed schemes of the present description may also be extendedly applied for D2D communication.

Herein, for example, the D2C communication implies that a UE directly communicates with another UE by using a wireless channel. Herein, for example, the UE implies a user terminal. However, when a network device such as a base station transmits/receives a signal according to a communication scheme between the UEs, it may also be considered as a sort of the UE.

In addition, for example, the proposed schemes of the present description may be applied limitedly only to the MODE #3 V2X operation (and/or MODE #4 V2X operation).

In addition, for example, the proposed schemes of the present description may be applied limitedly only to pre-configured(/signaled) (specific) V2X channel(/signal) transmission (e.g., PSCCH (and/or (associated) PSCCH and/or PSBCH)).

In addition, for example, the proposed schemes of the present description may be applied limitedly only when a PSSCH and an (associated) PSCCH are transmitted in an adjacent (and/or non-adjacent) manner (on a frequency domain) (and/or when transmission based on a pre-configured(/signaled) MCS(Modulation and Coding Scheme) (and/or coding rate and/or RB (value(/range))) is performed).

In addition, the proposed schemes of the present description may be applied limitedly only between MODE #3 (and/or MODE #4) V2X carriers (and/or (MODE #4(/3)) SL(/UL) SPS (Semi-Persistent Scheduling) (and/or SL(/UL) dynamic scheduling) carriers).

In addition, for example, the proposed schemes of the present description may be applied (limitedly) only when a synchronization signal (transmission (and/or reception)) resource location and/or count (and/or a V2X resource pool-related subframe position and/or count (and/or a sub-channel size and/or count)) is identical (and/or (partially) different) between carriers.

Figure 14:
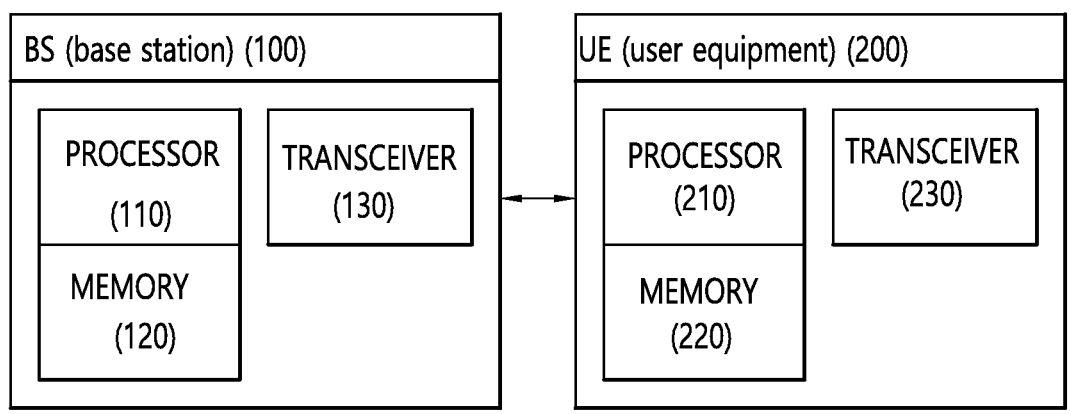
FIG. 14 is a block diagram showing a communication device for which an embodiment of the present description is implemented.

FIG. 14 is a block diagram showing a communication device for which an embodiment of the present description is implemented.

Referring to FIG. 14, a BS 100 includes a processor 110, a memory 120, and a transceiver 130. The processor 110 implements the proposed functions, procedures, and/or methods. The memory 120 is coupled to the processor 110 to store a variety of information for driving the processor 110. The transceiver 130 is coupled to the processor 110 to transmit and/or receive a radio signal.

A UE 200 includes a processor 210, a memory 220, and a transceiver 230. The processor 210 implements the proposed functions, procedures, and/or methods. The memory 220 is coupled to the processor 210 to store a variety of information for driving the processor 210. The transceiver 230 is coupled to the processor 210 to transmit and/or receive a radio signal. The UE 200 may perform a D2D operation on another UE according to the aforementioned method.

The processors 110 and 210 may include Application-specific Integrated Circuits (ASICs), other chipsets, logic circuits, and/or data processors. The memories 120 and 120 may include Read-Only Memory (ROM), Random Access Memory (RAM), flash memory, memory cards, storage media and/or other storage devices. The transceivers 130 and 230 may include a baseband circuit for processing a radio signal. When the embodiment is implemented in software, the aforementioned scheme may be implemented using a module (process, function, etc.) which performs the above function. The module may be stored in the memories 120 and 220 and executed by the processors 110 and 210. The memories 120 and 220 may be disposed to the processors 110 and 210 internally or externally and connected to the processors 110 and 210 using a variety of well-known means.

Figure 15:
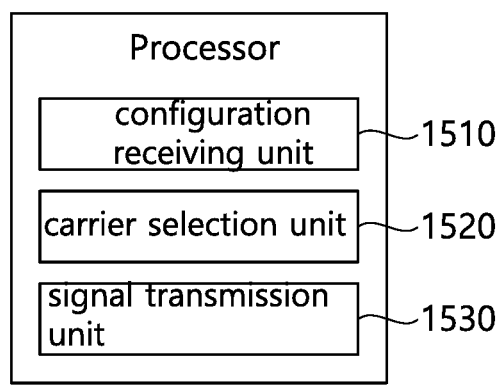
FIG. 15 is a block diagram showing an example of a device included in a processor.

FIG. 15 is a block diagram showing an example of a device included in a processor.

Referring to FIG. 15, the processor may include a configuration receiver 1510, a carrier selector 1520, and a signal transmitter 1530. Herein, the processor may be the processor 110 or 210 of FIG. 14.

Herein, the configuration receiver may have a function of receiving from a network a configuration for indicating a specific carrier on which a service having a highest priority is transmitted or received. In addition, the carrier selector may have a function of selecting a carrier from among carriers in a specific range in a frequency domain with reference to the specific carrier indicated by the configuration. In addition, herein, the signal transmitter may have a function of transmitting a V2X signal on the selected carrier.

Descriptions on a device included in the processor described above are for exemplary purposes only, and thus the processor may further include other functional elements or devices. In addition, since detailed examples for operations performed by each of the aforementioned functional devices are the same as described above, redundant descriptions thereof will be omitted.

What is claimed is:

1. A method for transmitting a vehicle to everything (V2X) signal in a wireless communication system, the method performed by a user equipment (UE) and comprising:
   receiving, from a network, configuration information informing the UE of a specific carrier on which a first service is transmitted or received;
   selecting a carrier from among a plurality of carriers based on a separation distance from the specific carrier; and
   transmitting the V2X signal related to a second service on the-selected carrier,
   wherein the first service has a higher priority than the second service, and
   wherein a channel busy ratio (CBR) value for each of the plurality of carriers is lower than a threshold value.

2. The method of claim 1, wherein the selected carrier is the carrier separated by a greatest distance from the specific carrier among the plurality of carriers having a CBR value less than or equal to the threshold value.

3. The method of claim 1, wherein the threshold value is configured based on a type of the V2X signal, a priority of the V2X signal, and maximum transmit power allowed to V2X signal transmission.

4. The method of claim 3, wherein the threshold value is configured to be lower based on a level of separation from the specific carrier being smaller, a priority of the V2X signal being lower, and maximum transmit power allowed for the V2X signal transmission being greater.

5. The method of claim 1, wherein a resource used to transmit the V2X signal is a resource not overlapping, in a time domain, with a resource reserved for the first service on the specific carrier.

6. The method of claim 1, wherein a resource used to transmit the V2X signal is a resource not overlapping, in a time domain, with a resource for transmitting specific signal transmission for the first service on the specific carrier.

7. The method of claim 6, wherein the specific signal is a physical sidelink broadcast channel (PSBCH) or a sidelink synchronization signal (SLSS).

8. The method of claim 1,
   wherein the UE determines whether the first service is detected in the specific carrier,
   wherein the UE measures a first service-specific channel busy ratio (CBR); and
   wherein the UE performs the V2X operation in the specific carrier in a time duration in which the first service-specific CBR value is lower than a pre-configured threshold and the first service is not detected, and the UE performs the V2X operation in the selected carrier in at least one of a time duration in which the first service is detected and a time duration in which the first service-specific CBR value is higher than the pre-configured threshold.

9. The method of claim 1, wherein the selected carrier has a greatest distance with the specific carrier among the plurality of carriers.

10. The method of claim 1, wherein the threshold value is determined based on a distance between the specific carrier and each of the plurality of carriers.

11. A user equipment (UE) comprising:
    a transceiver for transmitting and receiving a radio signal; and
    a processor operatively coupled with the transceiver, wherein the processor is configured to:
    receive, from a network, configuration information informing the processor of a specific carrier on which a first service is transmitted or received;
    select a carrier from among a plurality of carriers based on a separation distance from the specific carrier; and
    transmit the V2X signal related to a second service on the selected carrier,
    wherein the first service has a higher priority than the second service, and
    wherein a channel busy ratio (CBR) value for each of the carriers is lower than a threshold value.

12. The UE of claim 11, wherein the UE communicates with at least one of a mobile terminal, a network or autonomous vehicles other than the UE.

* * * * *